United States Patent
Duyverman

[15] 3,686,333
[45] Aug. 22, 1972

[54] PROCESS FOR PREPARING UNSATURATED ALCOHOLS

[72] Inventor: Coenraad J. Duyverman, Sittard, Netherlands

[73] Assignee: Stamicarbon N.V., Heerlen, Netherlands

[22] Filed: Aug. 30, 1968

[21] Appl. No.: 756,400

[30] Foreign Application Priority Data

Sept. 1, 1967 Netherlands............6,712,077

[52] U.S. Cl..............................260/638 B, 252/431 C
[51] Int. Cl..........................C07c 29/14, B01j 11/32
[58] Field of Search......................260/638 B, 638 A

[56] References Cited

UNITED STATES PATENTS

| | | |
|---|---|---|
| 2,009,948 | 7/1935 | Schmidt et al. .........260/638 B |
| 2,374,379 | 4/1945 | Rittmeister............260/638 A |
| 2,763,696 | 9/1956 | Finch et al. ............260/638 B |
| 3,466,339 | 9/1969 | Duyverman............260/638 B |

FOREIGN PATENTS OR APPLICATIONS 6,409,479 2/1966 Netherlands...........260/638 B

*Primary Examiner*—Leon Zitver
*Assistant Examiner*—Joseph E. Evans
*Attorney*—Cushman, Darby & Cushman

[57] ABSTRACT

A process for preparing unsaturated alcohols from the corresponding unsaturated aldehydes with the aid of hydrogen at elevated temperature and pressure and in the liquid phase is disclosed, wherein a catalyst which is dissolved in the liquid phase is utilized. The catalyst contains a cadmium salt and at least one salt of a transition metal from the groups 3$b$, 4$b$, 5$b$ and 6$b$ of the Periodic System. The catalyst system is highly selective and the selectivity is retained.

8 Claims, No Drawings

3,686,333

PROCESS FOR PREPARING UNSATURATED ALCOHOLS

BACKGROUND OF THE INVENTION

It is known to convert α, β-unsaturated aldehydes into the corresponding unsaturated alcohols in the gaseous phase by means of hydrogenation with the use of a catalyst containing cadmium and, in addition, one or more metals from the first, second, sixth, and/or eighth group of the Periodic System which, by themselves, are catalytically active in vapor phase hydrogenation and dehydrogenation. Examples of suitable metals are iron, cobalt, nickel, copper, silver, chromium, molybdenym and tungsten.

It is also known to convert α, β-unsaturated aldehydes into the corresponding unsaturated alcohols in the liquid phase by means of hydrogenation with the use of a mixture of a copper soap and a cadmium soap. It is assumed that the copper salt is the catalyst proper and that the cadmium salt only serves the function of preventing the copper salt from being reduced to metallic copper. The use of a solution of a mixture of a copper salt and a cadmium salt for catalyst has the drawback, however, that the system is extremely unstable under the required processing conditions and that only minute failures may give rise to reduction of the $Cd^{2+}$ salt and/or the $Cu^{2+}$ salt to metals. As a consequence, the catalyst solution becomes ever poorer in the abovementioned salts and soon loses its activity. Hence, the use of a copper salt will not produce the desired optimum result when the process is applied on an industrial scale.

It is surprising that a cadmium salt alone is catalytically active in the conversion of unsaturated aldehydes to unsaturated alcohols and, in addition, more selective than the mixture of a copper salt and a cadmium salt used for catalyst. However, the system is unstable and metallic cadmium is readily formed. The cadmium metal can be catalytically active, it is true, but its life as a catalyst is limited at the prevalent temperature by recrystallization of the metallic cadmium (see Kin. and Cat., 2, page 426 (1961)).

SUMMARY OF THE INVENTION

Unsaturated aldehydes are converted into the corresponding unsaturated alcohols in a liquid phase reaction with the aid of hydrogen at elevated temperature and pressure in the presence of a catalyst which contains a cadmium salt and at least one salt of a transition metal of the groups 3b, 4b, 5b and 6b of the Periodic System (Handbook of Chemistry and Physics, 45th edition). The transition metal salts are not catalytically active themselves but appear to stabilize the cadmium catalyst, and the resulting system has high selectivity and stability.

DETAILED DESCRIPTION OF THE INVENTION

In the liquid phase hydrogenation of unsaturated aldehydes to the corresponding alcohols, the cadmium salt catalyst is no longer readily reduced to metal if at least one salt of a transition metal from the groups 3b, 4b, 5b and 6b of the Periodic System, (numbers as stated in the Handbook of Chemistry and Physics, 45th edition) is also present. The dissolved metal salts apparently stabilize the cadmium catalyst, but are not catalytically active themselves, so that the selectivity of the reaction is fully retained. Neither is there any reduction of the said transition metals, and the process conditions are not particularly critical to catalyst stability. Good results are obtained in particular if a salt of chromium or vanadium is added. Salts of titanium and scandium are slightly less preferred.

As the hydrogenation is generally carried out in a hydrocarbon medium, use is preferably made of a mixture of a fatty acid salt of cadmium and a fatty acid salt of the other metal, which mixture can be made to dissolve in the hydrocarbon. Suitable fatty acid salts are the salts derived from fatty acids with at least six and up to 24 or more carbon atoms, e.g. caprylates, stearates, oleates, linoleates and linolenates and mixtures thereof. A difference in catalytic behavior between these cadmium salts cannot be observed.

The hydrogenation rate increases with the cadmium salt concentration of the solution. Good results can be obtained by the process according to the invention if 0.1 to 10 moles, preferably 0.5 to 5 moles, of cadmium salt are present per 100 moles of unsaturated aldehyde to be converted.

In the process according to the invention use is most preferably made of a mixture of the fatty acid salts of the said transition metals and those of cadmium in a molar ratio ranging from 1:5 to 1:1. However, this ratio may be varied within wide limits; the lower limit of the ratio of the transition metals to cadmium is preferably at least 1:10, the upper limit may have any value. The reaction rate increases with temperature. At 200° C and a hydrogen pressure of 100 atm gauge the hydrogenation of the unsaturated aldehydes still proceeds somewhat slowly. Raising the hydrogen pressure also raises the reaction rate, without reducing the selectivity for unsaturated alcohol. By preference, the reaction is carried out at a temperature ranging between 200° and 300° C and a pressure ranging between 50 and 300 atm gauge.

The unsaturated aldehyde starting materials of the present process are unsaturated aldehydes containing from three to about 20 carbon atoms. Preferably, the unsaturated aldehydes are (lower) alkenyl aldehydes of three to ten carbon atoms, and most preferably the aldehydes are acrolein or crotonaldehyde. The alcohols produced correspond to the starting aldehydes, and thus will also contain from three to about 20 carbon atoms.

To carry out the process in the liquid phase, the unsaturated aldehyde is dissolved in a suitable solvent. The solvent must satisfy the following conditions:
1. the catalyst must be soluble in it;
2. it must be inert, under the prevalent reaction conditions, to the starting material and to the compounds resulting from the reaction;
3. it must have a good dissolving ability for hydrogen; and
4. it must preferably have a low vapor tension.

These conditions are satisfied by saturated aliphatic, alicyclic and aromatic hydrocarbons with at least eight carbon atoms. Such suitable solvents are, i.a., decahydronaphthalene, sold under the trademark Decalin, and paraffin oil.

In addition to hydrogenation, "polymerization" of the unsaturated aldehyde and unsaturated alcohol always takes place. The term "polymerization" as used here includes dimerization and oligomerization. Choosing the correct reaction conditions, catalyst concentration and concentration of unsaturated aldehyde makes it possible so to accelerate the hydrogenation with respect to the "polymerization" that losses of unsaturated aldehyde can be limited or even avoided.

EXAMPLES OF THE INVENTION

In the following examples, unless indicated otherwise, about 300 ml of Decalin were heated to the indicated reaction temperature at a hydrogen pressure of about 75 atmospheres in a stainless steel 1 liter autoclave provided with a stirrer. The unsaturated aldehyde and a solution of the metal salts dissolved in additional Decalin were subsequently introduced into the autoclave with the aid of additional hydrogen. Periodically over the course of the reaction, liquid samples were taken and were analyzed on a gas chromatograph to study the course of the hydrogenation. In addition, the percentage of the dissolved cadmium salt and the salt of the transition metal were determined in the samples. Acrolein was hydrogenated to allyl alcohol and crotonaldehyde was hydrogenated to crotyl alcohol.

EXAMPLE I

The amount of dissolved $Cr^{3+}$ oleate was varied between a molar ratio of 0.1:1 and a molar ratio of 2.0:1 (constant Cd content) of the cadmium oleate in solution. No $Cd^{2+}$ was reduced to metal in the interval under consideration in hydrogenating acrolein.

EXAMPLE II

A catalyst solution containing $Cd^{2+}$ and $Cr^{3+}$ (oleate) in a 1:1 molar ratio was used several times in succession for hydrogenating acrolein. No change in the concentration of the salts components was observed in the successive experiments with this catalyst solution.

EXAMPLE III - PRIOR ART a. Acrolein was hydrogenated to allyl alcohol with a mixture of copper oleate and cadmium oleate as a catalyst. 360 g of Decalin were heated to 255° C under a hydrogen pressure of 65 atm gauge with simultaneous stirring. Subsequently, 7.5 grams of acrolein (0.134 mole), together with solution of $3.5 \times 10^{-3}$ mole of Cd oleate and $3.5 \times 10^{-3}$ mole of Cu oleate in 90 grams of Decalin, were forced into the autoclave by means of hydrogen. The temperature of the liquid in the autoclave was maintained at 245° C, the total pressure was 120 atm. After a reaction time of 30 minutes the liquid in the autoclave contained:

acrolein : $0.10 \times 10^{-2}$ mole/100 g of reaction liquid
propionaldehyde: $0.19 \times 10^{-2}$ mole/100 g of reaction liquid
allyl alcohol : $0.77 \times 10^{-2}$ mole/100 g of reaction liquid
propanol-1 : $0.22 \times 10^{-2}$ mole/100 g of reaction liquid.

The selectivity, expressed as:

$$\frac{\text{moles of allyl alcohol}}{\text{sum of moles of hydrogenation products}} \times 100,$$

was 65.

b. Acrolein was hydrogenated with cadmium oleate as the sole catalyst. 260 grams of Decalin were heated to 230° C under a hydrogen pressure of 100 atm gauge with simultaneous stirring. Subsequently, a solution of 8.3 grams of acrolein (0.15 mole) and $3.0 \times 10^{-3}$ mole of Cd oleate in 90 grams of Decalin was forced into the autoclave by means of hydrogen. The temperature of the reaction liquid was stabilized at 220°C. The total pressure was 150 atm gauge. After a reaction time of 15 minutes the composition of the reaction liquid was:

acrolein : $0.3 \times 10^{-2}$ mole/100 g of reaction liquid
propionaldehyde: $<0.1 \times 10^{-2}$ mole/100 g of reaction liquid
allyl alcohol : $1.2 \times 10^{-2}$ mole/100 g of reaction liquid
propanol-1 : $0.35 \times 10^{-2}$ mole/100 g of reaction liquid
"polymer" : $\approx 0.1 \times 10^{-2}$ mole/100 g of reaction liquid (calculated as acrolein).

The selectivity, expressed as:

$$\frac{\text{moles of allyl alcohol}}{\text{sum of moles of hydrogenation products}} \times 100,$$

was 72.

The amount of Cd salt in the total amount of reaction liquid was:
at time 0: $3 \times 10^{-3}$ mole
after 15 minutes: $2 \times 10^{-3}$ mole
after 60 minutes: $0.8 \times 10^{-3}$ mole.

c. Crotonaldehyde was hydrogenated with cadmium oleate as the sole catalyst. 375 grams of Decalin were heated to 230° C under a hydrogen pressure of 100 atm gauge. Subsequently, 42.5 g of crotonaldehyde (0.61 mole) were forced into the autoclave together with a solution of $3.5 \times 10^{-3}$ mole of Cd oleate in 75 g of Decalin. The temperature was stabilized at 225° C. The total pressure was 150 atm. After a reaction time of 20 minutes the reaction liquid contained:

crotonaldehyde: $2.3 \times 10^{-2}$ mole/100 g of reaction liquid
butyraldehyde : $0.2 \times 10^{-2}$ mole/100 g of reaction liquid
cis- + trans-crotyl alcohol: $3.75 \times 10^{-2}$ mole/100 g of reaction liquid
butanol-1 : $0.55 \times 10^{-2}$ mole/100 g of reaction liquid
"polymer" : $\approx 2.3 \times 10^{-2}$ mole/100 g of reaction liquid (calculated as crotonaldehyde).

Selectivity $$= \frac{\text{moles of crotyl alcohol}}{\text{sum of moles of hydrogenation products}} \times 100 = 83$$

The amount of Cd salt dissolved in the total amount of reaction liquid was:
at time 0 : $3.5 \times 10^{-3}$ mole
after 20 minutes: $2.3 \times 10^{-3}$ mole
after 60 minutes: $1.5 \times 10^{-3}$ mole.

EXAMPLE IV

Crotonaldehyde was hydrogenated with Cd oleate + Cr oleate as a catalyst (ionic $Cr^{3+}/Cd^{2+}$ ratio = 0.12). 375 grams of Decalin were heated to 225° C under a hydrogen pressure of 100 atm gauge with simultaneous stirring. Subsequently, 42.5 grams of crotonaldehyde (0.61 mole), together with a solution of $3.4 \times 10^{-3}$ mole of Cd oleate + 0.41 × 10⁻³ mole of Cr oleate in 75 grams of Decalin, were forced into the autoclave by means of hydrogen. The temperature of the liquid in the autoclave was stabilized at 220° C. The total pressure was 150 atm gauge.

After a reaction time of 35 minutes the reaction liquid contained:
crotonaldehyde: $4.3 \times 10^{-2}$ mole/100 g of reaction liquid
butyraldehyde : $0.3 \times 10^{-2}$ mole/100 g of reaction liquid
cis- + trans-crotyl alcohol: $3.45 \times 10^{-2}$ mole/100 g of reaction liquid
butanol-1 : $0.25 \times 10^{-2}$ mole/100 g of reaction liquid
"polymer" : $\approx 1.0 \times 10^{-2}$ mole/100 g of reaction liquid (calculated as crotonaldehyde)

Selectivity
$$= \frac{\text{moles of crotyl alcohol}}{\text{sum of moles of hydrogenation products}} \times 100 = 86$$

The cadmium and chromium content of the solution was not appreciably decreased in the testing period of over 2 hours.

EXAMPLE V

Crotonaldehyde was hydrogenated with cadmium oleate + chromium oleate as a catalyst (ionic $Cr^{3+}/Cd^{2+}$ ratio = 0,97). 375 grams of Decalin were heated to 225° C under a hydrogen pressure of 100 atm gauge with simultaneous stirring. Subsequently, 42.5 grams of crotonaldehyde (= 0.61 mole), together with a solution of $3.4 \times 10^{-3}$ mole of Cd oleate + $3.3 \times 10^{-3}$ mole of Cr oleate in 75 grams of Decalin, were forced into the autoclave by means of hydrogen. The temperature of the liquid was maintained at 220° C; the total pressure was 150 atm gauge. After a reaction time of 60 minutes the reaction liquid contained:
crotonaldehyde: $5.0 \times 10^{-2}$ mole/100 g of reaction liquid
butyraldehyde : $0.15 \times 10^{-2}$ mole/100 g of reaction liquid
cis- + trans-crotyl alcohol: $1.0 \times 10^{-2}$ mole/100 g of reaction liquid
butanol-1 : $0.05 \times 10^{-2}$ mole/100 g of reaction liquid
"polymer" : $\approx 3.0 \times 10^{-2}$ mole/100 g of reaction liquid (calculated as crotonaldehyde).

Selectivity
$$= \frac{\text{moles of crotyladehyde}}{\text{sum of moles of hydrogenation products}} \times 100 = 83$$

The cadmium and chromium content of the solution did not decrease in the testing period of over 3 hours.

EXAMPLE VI

Acrolein was hydrogenated with cadmium oleate + vanadium oleate as a catalyst (atomic V/Cd ratio = 1.0). 360 grams of Decalin were heated to 230° C under a hydrogen pressure of 75 atm gauge. Subsequently, 8.3 grams of acrolein (= 0.15 mole) + $3.6 \times 10^{-3}$ mole of Cd oleate + $3.6 \times 10^{-3}$ mole of V oleate + 80 grams of Decalin were forced into the autoclave by means of hydrogen. The temperature of the liquid in the autoclave was maintained at 225° C, the total pressure was 150 atm gauge. After a reaction time of 60 minutes the composition of the reaction liquid was:
acrolein : $0.55 \times 10^{-2}$ mole/100 g of reaction liquid
propionaldehyde: $0.08 \times 10^{-2}$ mole/100 g of reaction liquid
allyl alcohol: $0.6 \times 10^{-2}$ mole/100 g of reaction liquid
n-propanol : $0.17 \times 10^{-2}$ mole/100 g of reaction liquid
"polymer" : $\approx 0.1 \times 10^{-2}$ mole/100 g of reaction liquid (calculated as acrolein).
Selectivity = 70.

The Cd and V contents did not change in the experiment.

EXAMPLE VII

The hydrogenation of acrolein with cadmium oleate and chromium oleate as a catalyst was compared with the hydrogenation of acrolein with a catalyst of cadmium oleate, chromium oleate and copper oleate. Solution 1 contained 8.3 g (= 0.15 mole) of acrolein, $3.6 \times 10^{-3}$ mole of Cd oleate, and $1.2 \times 10^{-3}$ mole of Cr oleate in 440 grams of Decalin. Solution 2 contained 8.3 g (= 0.15 mole) of acrolein, $3.6 \times 10^{-3}$ mole of Cd oleate, $1.2 \times 10^{-3}$ mole of Cr oleate and $3.5 \times 10^{-3}$ mole of Cu oleate in 440 grams of Decalin. The hydrogenation of acrolein was effected at 225° C and a total pressure of 150 atm gauge for both solutions. The hydrogenation of acrolein to allyl alcohol proceeded more rapidly by a factor 1.3 in solution 2 than in solution 1. The selectivity for allyl alcohol, expressed as:

$$\frac{\text{moles of allyl alcohol}}{\text{sum of moles of hydrogenation products}} \times 100,$$

amounts to:
70 for solution 1,
65 for solution 2.

EXAMPLE VIII

Acrolein was hydrogenated with cadmium oleate + titanium oleate as a catalyst (atomic Ti/Cd ratio = 0.3). 360 grams of Decalin were heated to 235° C under a hydrogen pressure of 75 atm gauge. subsequently, 8.3 g of acrolein (= 0.15 mole) + $3.6 \times 10^{-3}$ mole of Cd oleate + $1.1 \times 10^{-3}$ mole of Ti oleate + 80 grams of Decalin were forced into the autoclave by means of hydrogen. The temperature of the liquid in the autoclave was maintained at 230° C; the total pressure was 150 atm gauge. After a reaction time of 30 minutes the liquid in the autoclave contained:
acrolein : $0.53 \times 10^{-2}$ mole/100 g of reaction liquid
propionaldehyde: $0.12 \times 10^{-2}$ mole/100 g of reaction liquid
allyl alcohol : $0.72 \times 10^{-2}$ mole/100 g of reaction liquid
n-propanol : $0.26 \times 10^{-2}$ mole/100 g of reaction liquid
"polymer" : $\approx 0.1 \times 10^{-2}$ mole/100 g of reaction liquid
Selectivity
$$= \frac{\text{moles of allyl alcohol}}{\text{sum of moles of hydrogenation products}} \times 100 = 66$$

During this reaction period the amount of cadmium in solution fell from $3.6 \times 10^{-3}$ gram atom of Cd to $2.5 \times 10^{-3}$ gram atom of Cd. The titanium content of the solution remained constant.

The following conclusions may be drawn from the examples above:
a. A copper salt is catalytically active and reduces the selectivity of the reaction (example VII and examples IIIa and VII as against example IIIb);
b. A cadmium salt alone is catalytically active, but the amount of cadmium salt in the solution decreases during the reaction (examples IIIb and IIIc);

c. The addition of a salt of one of the metals from the said groups of transition metals stabilizes a cadmium-salt solution (examples I, IV, V and VI);

d. Salts of the transition metals in question are not reduced under the prevailing process conditions (examples II, IV, V, VI and VIII);

e. A cadmium salt in combination with a salt of a suitable transition metal gives the same selectivity for the formation of unsaturated alcohols as a cadmium salt alone (example IIIc as against examples IV and V; also compare example IIIb with examples VI and VIII); and f. A chromium salt, in particular, produces good results as regards the stabilizing effect on the cadmium (examples IV and V, and example VIII).

What is claimed is:

1. In a process for preparing unsaturated aliphatic alcohols from alkenals having three to about 20 carbon atoms by hydrogenating said alkenals at a temperature between about 200° and about 300° C and a hydrogen pressure of about 50 to about 300 atmospheres, and in the liquid phase in which a hydrogenation catalyst has been dissolved, the improvement comprising using, as said hydrogenation catalyst, a mixture of a cadmium salt of a fatty acid containing at least six carbon atoms which is soluble in the reaction mixture, and at least one transition metal salt of a fatty acid containing at least six carbon atoms which is soluble in the reaction mixture, said transition metal being selected from the groups 3b, 4b, 5b and 6b of the Periodic System (Handbook of Chemistry and Physics, 45th edition).

2. A process as claimed in claim 1 wherein said salt of a transition metal is a salt of chromium, vanadium, titanium, scandium or mixtures thereof.

3. A process as claimed in claim 1 wherein from about 0.1 to about 10 moles of cadmium salt are present per 100 moles of unsaturated aldehyde in the reaction liquid.

4. A process as claimed in claim 3, wherein 0.5 to 5 moles of cadmium salt are present per 100 moles of unsaturated aldehyde in the reaction system.

5. A process as claimed in claim 1, wherein the molar ratio of the transition metal salts to cadmium salts is at least about 1:10.

6. The process as claimed in claim 5, wherein the molar ratio of the transition metal salts to the cadmium salts is from about 1:5 to about 1:1.

7. The process as claimed in claim 1, wherein said unsaturated aldehyde is selected from the group consisting of acrolein and crotonaldehyde.

8. The process as claimed in claim 7, wherein said transition metal is chromium.

* * * * *